May 20, 1930. J. TEMPLE 1,759,288
CUTTING TORCH HOLDER
Filed June 14, 1926 2 Sheets-Sheet 1
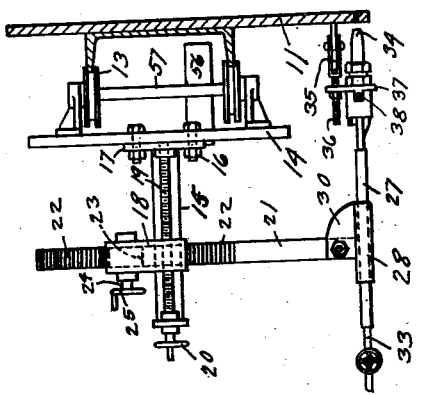
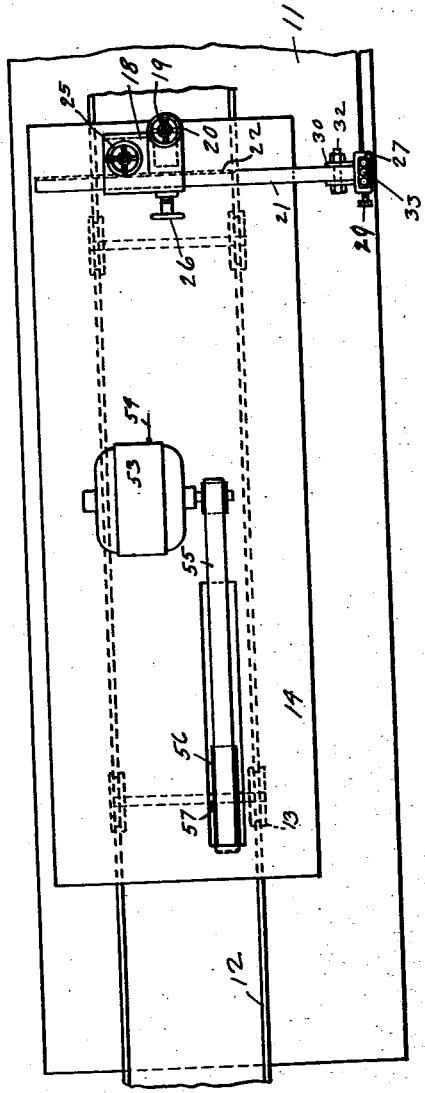
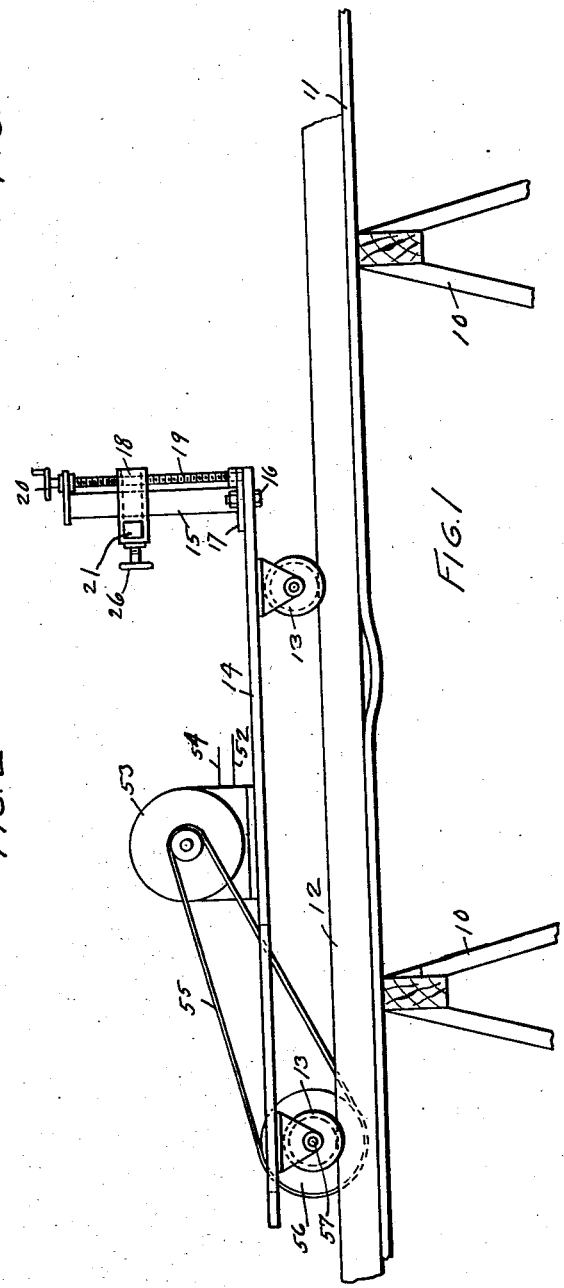
INVENTOR
JAMES TEMPLE
BY Birkenbeul
ATTORNEY.

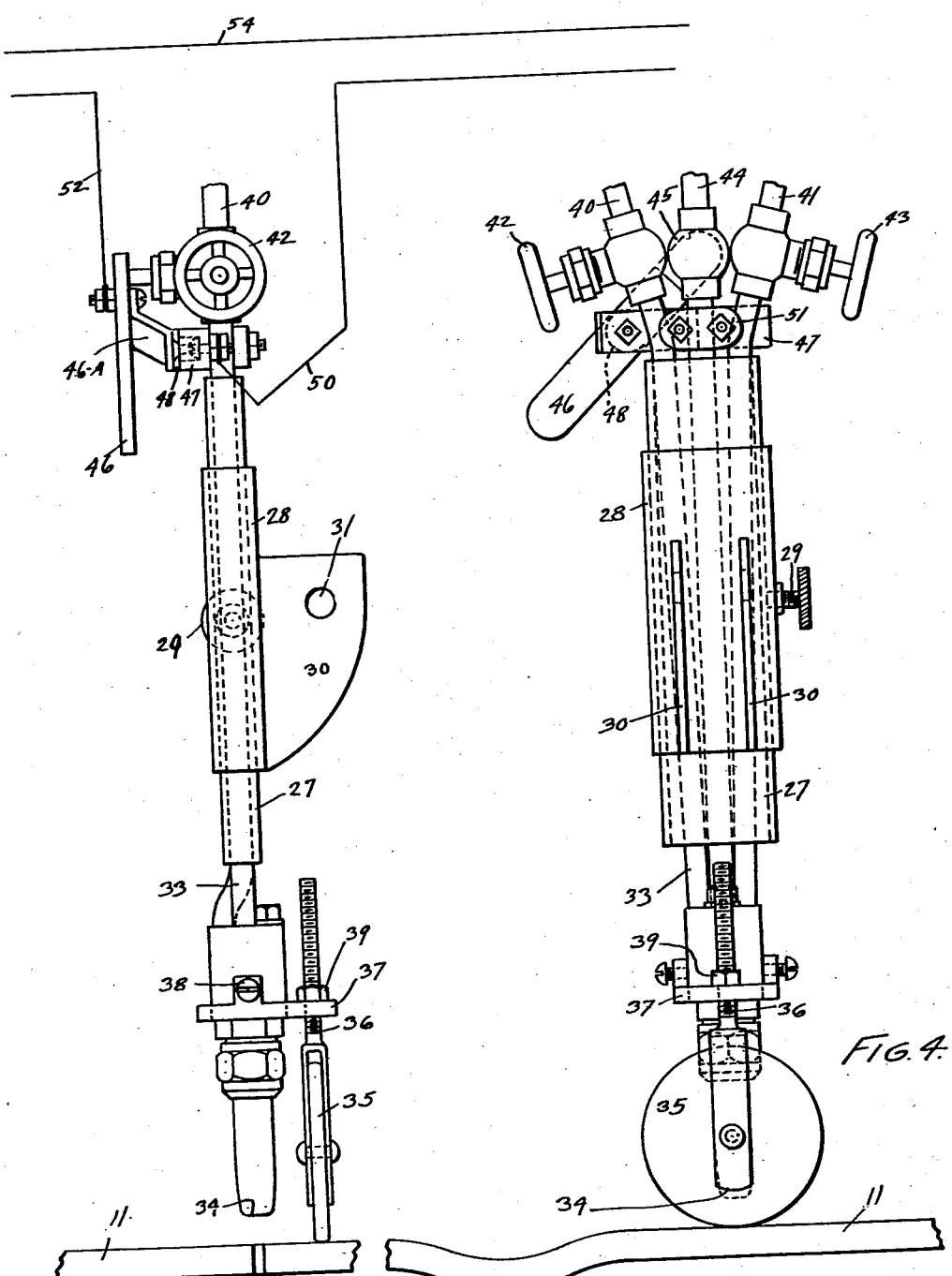

Patented May 20, 1930

1,759,288

UNITED STATES PATENT OFFICE

JAMES TEMPLE, OF PORTLAND, OREGON

CUTTING-TORCH HOLDER

Application filed June 14, 1926. Serial No. 115,870.

This invention relates generally to the art of cutting metals with a gas flame, and particularly to a special form of holder for cutting torches.

The first object of this invention is to provide a cutting torch holder which is very portable, in the sense that it can readily be attached to various machines. For example— it can be placed on the carriage of a planer for the purpose of cutting off excess metal before starting the planing operation.

The second object is to so construct same that it can be used on a bracket in front of live rolls.

The third object is to so construct the holder that it automatically adjusts itself to irregularities in the surface of the metal being cut, such as buckled plates or irregular forgings over which the torch can travel, and at the same time maintain an absolutely fixed distance between the tip of the torch and the surface of the metal being cut.

The fourth object is to enable the head to be used on a carriage in a manner that a reverse cut may be made without changing the carriage or track setting, thereby making it possible to secure two parallel cuts in one piece without a change of setting or taking a measurement.

The fifth object is to so construct the device that the operator can cause the torch to completely cut through the metal at the beginning of a cut before starting to feed the torch or the work, in order to avoid splashes and irregular or incompleted cuts, as is now the case where torches are mounted on carriages and fed mechanically.

The sixth object is the construction of a switch on the holder which will enable the operator to make a perpendicular cut after stopping his feed motor.

Special reference is had to my Patent No. 1,569,154 in which a torch is mounted on a carriage which is propelled by an electric motor having a variable speed control in which the current to the starting motor is controlled by the same lever that controls the flow af gas to the torch.

These, and other objects, will become more apparent from the specification following as illustrated in the accompanying drawings, in which:

Figure 1 is a side elevation of a simple form of carriage having this device mounted thereon, said carriage wheels riding on a track which is placed over an irregular plate, and with the torch holder removed. Figure 2 is a plan of Figure 1 showing the torch and holder in position. Figure 3 is an end elevation of Figure 2. Figure 4 is an enlarged side elevation of the torch holder and torch. Figure 5 is a front elevation of Figure 4.

Similar numbers of reference refer to the same parts throughout the several views.

Referring in detail to the drawings, there is illustrated a pair of horses 10 upon which is placed an irregular plate 11 which is to be cut off on one side. On the plate 11 is placed a track 12 on which can roll the wheels 13 of a typical form of carriage 14, on one end of which is mounted the upright post 15 by means of the bolts 16 which pass through the flanged base 17 of the post 15. Slidably mounted on the post 15 is a slide member 18 whose vertical position is determined by the screw 19 which journals at opposite ends of the post 15 and is provided with a hand wheel 20. The slide 18 also forms a guide for the horizontal arm 21, in one side of which is formed a rack 22 adapted to be moved by the pinion 23 on the shaft 24 which can be rotated by the hand wheel 25.

A hand set screw 26 is used ɔ lock the arm 21 in the desired position. At the outer end of the arm 21 is mounted my special torch holder consisting of the vertical slide 27 which can move freely in the guide 28, but in which it can be rigidly held by the screw 29. Ears 30 on the guide 28 are provided with holes 31 for the bolt 32 which permit the guide 28 to be held at any desired angle—that is, transversely with the track, or to clamp the torch holder rigidly in a desired position.

To the vertical slide 27 is secured any convenient type of torch 33 whose tip 34 can be held at any distance above the plate 11 that seems most desirable by means of the wheel 35 whose threaded support 36 passes through the arm 37 which is fastened to the lowermost portion of the torch 33 by means of the screws 38. A nut 39 on the member 36 is used to adjust the height of the tip 34 above the plate 11.

The torch in this case consists of the usual acetylene and oxygen heating pipes 40 and 41 which are provided with the usual regulating valves 42 and 43. The cutting oxygen pipe 44 is provided with a cock 45 whose lever 46 is provided with a contact arm 46—A which sweeps across the insulated bracket 47 bearing the metallic plate 48 electrically connected with a source of power by means of the wire 50. A clamp 51 is employed to hold the bracket 47 to the pipe 44. The arm 46—A is connected by means of the wire 52 to the motor 53 whose other terminal is connected by means of the wire 54 to the power line. A belt 55 from the motor 53 passes around the large pulley 56 on the shaft 57 to drive the carriage. This carriage drive is, of course, only schematic and is utilized merely to illustrate the operation of the device, which is as follows:

If, for example, it is desired to cut off both edges of a plate 11 the track 12 is placed thereon and on the track is placed the carriage 14 which carries the torch above described. By manipulating the hand wheels 20 and 25 the torch holder is moved to the desired lateral position. The wheel 35 is now adjusted for the purpose of holding the tip 34 a uniform distance above the plate 11.

The cut is now started in the usual way by first applying the preheating flame until the flame starts to cut through the plate and then applying the cutting flame as is common practice. After the flame has completely cut through the plate the operator moves his lever 46 sufficiently far to close the motor switch, which causes the carriage 14 to travel forward in the manner described in my previously mentioned patent.

To cut the opposite side of the plate, the carriage and track are not moved, but the torch holder is turned to the opposite side of the carriage and the operation of cutting repeated, naturally in a line parallel with the first cut without the necessity of taking more than one measurement, which is sufficient to establish the width of the newly cut plate.

If, for any reason, the plate 11 has become buckled or irregular in form the wheel 35 follows its contour closely, always holding the tip 34 at a uniform distance above the plate.

This is especially useful when cutting sheets which have been roughly handled or when cutting irregular edges, such as forgings, etc., and entirely eliminates the eye strain caused by the necessity of holding the tip 34 a uniform and correct distance from the plate 11.

When cutting a plate if it is desired to take a perpendicular cut without completely finishing the first portion of the cut it is only necessary to move the lever 46 to a position where the motor circuit is broken and to then feed the torch laterally by means of the hand wheel 25.

In existing devices in which cutting torches are carried on carriages, no provision is made for allowing the operator to hold his torch in a fixed position until the plate is cut through, before starting the carriage drive. This causes either a splash with its possible attending injuries, or permits a portion of the plate to remain uncut, which must later be cut through completely before the plate can be free from the original piece.

This is accomplished by simply enlarging the openings in the valve and body over what is the ordinary practice which allows a greater movement of the lever 46. That is to say, the lever 46 can be moved after the valve is wide open without closing the valve, which additional movement is employed to make the electrical contact which starts the feed motor.

Again, if the planer has a piece of work mounted thereon in which a large roughing cut must be taken from the edge of a plate which has been left irregular for one reason or another, it is only necessary to fasten the members 30 to an appropriate part of the planer, depending upon the type of planer being used, and to make the preliminary cut with a torch instead of with the more laborious and time-consuming planer.

Again, the member 28 can be mounted directly alongside of live rolls for carrying sheet metal. Obviously the angle of inclination and height of torch tip can be held under perfect control at all times regardless of surface irregularities in the plate itself without unduly taxing the eyes of the operator.

The outstanding feature of the device is the extreme portability of its torch holding mechanism, its use not being confined to the particular carriage illustrated but being especially adaptable to most forms of machines in which either the work or the tool is moved.

If it is not desired to utilize the supporting roller or wheel 35, as, for instance, at the finish of the cut or when the work is sufficiently straight for all practical purposes, the screw 29 is turned sufficiently far to clamp the member 27 within the guide 28.

As previously suggested, if it is desired to adjust the position of the tip 34 to meet such conditions as changes in plate thickness, varying kinds of metal, gas employed, etc., the operator can quickly and easily adjust this position by manipulating the nut 39. Obviously, the nut 39 can be replaced with a suitable hand wheel for still further expediting the adjustment of the wheel 35, since such adjustment is extremely desirable, owing to the conditions above described and particularly on account of scale, paint, and other foreign substances which require proper application of the cutting flame to secure desirable results.

I am aware that many forms of torch holding devices have been constructed in the past; I therefore have directed my claim to a special form thereof and do not intend to limit myself to the precise construction shown in the drawings, but intend to cover such forms and modifications thereof as fall fairly within the appended claim.

I claim:

A metal cutting burner of the type employing a motor driven carriage, a burner carried thereby having heating gas and cutting gas conduits each valve controlled, characterized by the provision of means for starting the motor by a movement of the cutting gas valve after the opening of the cutting gas conduit, whereby the motor need not be started until the initial cut is clear.

JAMES TEMPLE.